(12) United States Patent
Klein et al.

(10) Patent No.: US 9,106,671 B2
(45) Date of Patent: Aug. 11, 2015

(54) CAPABILITY DISCOVERY OPTIMIZATION

(75) Inventors: Mikael Klein, Huddinge (SE); Christer Boberg, Tungelsta (SE); Jan Lidin, Segeltorp (SE); Anders Lindgren, Älvsjö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 221 days.

(21) Appl. No.: 13/418,469

(22) Filed: Mar. 13, 2012

(65) Prior Publication Data
US 2013/0054740 A1 Feb. 28, 2013

Related U.S. Application Data

(60) Provisional application No. 61/526,529, filed on Aug. 23, 2011.

(51) Int. Cl.
*G06F 9/50* (2006.01)
*H04L 29/06* (2006.01)
*H04L 29/08* (2006.01)
*H04W 4/00* (2009.01)
*H04W 4/16* (2009.01)
*H04W 8/10* (2009.01)
*H04W 80/10* (2009.01)

(52) U.S. Cl.
CPC ........ *H04L 65/1059* (2013.01); *H04L 65/1069* (2013.01); *H04L 67/24* (2013.01); *G06F 9/5055* (2013.01); *H04L 65/1046* (2013.01); *H04L 65/1089* (2013.01); *H04L 65/1093* (2013.01); *H04L 67/14* (2013.01); *H04L 67/148* (2013.01); *H04W 4/00* (2013.01); *H04W 4/16* (2013.01); *H04W 80/10* (2013.01)

(58) Field of Classification Search
None
See application file for complete search history.

(56) References Cited

U.S. PATENT DOCUMENTS

| 7,756,928 | B1* | 7/2010 | Meenan et al. | 709/205 |
|---|---|---|---|---|
| 2006/0159037 | A1* | 7/2006 | Jabri et al. | 370/310 |
| 2006/0168642 | A1* | 7/2006 | Tachizawa et al. | 726/2 |
| 2006/0185021 | A1* | 8/2006 | Dujari et al. | 726/27 |
| 2006/0187858 | A1* | 8/2006 | Kenichi et al. | 370/254 |
| 2007/0259651 | A1* | 11/2007 | Bae et al. | 455/412.1 |
| 2008/0201748 | A1* | 8/2008 | Hasek et al. | 725/98 |
| 2010/0077031 | A1* | 3/2010 | Yoneda et al. | 709/204 |
| 2010/0088371 | A1* | 4/2010 | Xu et al. | 709/203 |
| 2010/0114706 | A1* | 5/2010 | Kosuru | 705/14.55 |
| 2010/0124318 | A1* | 5/2010 | Cai et al. | 379/93.24 |
| 2010/0131969 | A1* | 5/2010 | Tidwell et al. | 725/14 |
| 2010/0165947 | A1* | 7/2010 | Taniuchi et al. | 370/331 |
| 2010/0250725 | A1* | 9/2010 | Meenan et al. | 709/223 |
| 2010/0285777 | A1* | 11/2010 | Golobrodsky et al. | 455/412.2 |
| 2011/0022705 | A1* | 1/2011 | Yellamraju et al. | 709/224 |
| 2011/0060830 | A1* | 3/2011 | Kang et al. | 709/224 |

(Continued)

*Primary Examiner* — Ario Etienne
*Assistant Examiner* — Ho Shiu
(74) *Attorney, Agent, or Firm* — Patent Portfolio Builders PLLC

(57) ABSTRACT

Presented are methods and apparatus for optimizing access to service capabilities information for clients associated with user in a communication system. Communications requesting service capabilities information is directed through one or more capabilities application servers for inspection before forwarding the requests to their destination user's client device. If the capabilities application server has previously stored the information then the reply is generated from information stored on the capabilities application server and no request is forwarded to the user's client device, optimizing the process by reducing network communications.

14 Claims, 10 Drawing Sheets

(56) References Cited

U.S. PATENT DOCUMENTS

| | | | |
|---|---|---|---|
| 2011/0131619 A1* | 6/2011 | Hasek et al. | 725/93 |
| 2011/0141950 A1* | 6/2011 | Patil | 370/261 |
| 2011/0173188 A1* | 7/2011 | Walsh et al. | 707/722 |
| 2011/0196973 A1* | 8/2011 | Shaheen et al. | 709/228 |
| 2011/0222529 A1* | 9/2011 | Patil et al. | 370/352 |
| 2011/0231903 A1* | 9/2011 | Springer | 726/3 |
| 2011/0235591 A1* | 9/2011 | Iyer et al. | 370/328 |
| 2011/0317569 A1* | 12/2011 | Kneckt et al. | 370/252 |
| 2012/0005347 A1* | 1/2012 | Chen et al. | 709/226 |
| 2012/0185604 A1* | 7/2012 | Shatsky | 709/228 |
| 2013/0042025 A1* | 2/2013 | Ennesser | 710/5 |
| 2013/0117866 A1* | 5/2013 | Vedula et al. | 726/30 |
| 2013/0290552 A1* | 10/2013 | Nyberg et al. | 709/228 |

* cited by examiner

CAPABILITY DISCOVERY OPTIMIZATION

RELATED APPLICATION

The present application is related to, and claims priority from, U.S. Provisional Patent Application No. 61/526,529, filed Aug. 23, 2011, entitled "Capability Discovery Optimization", to Mikael Klein, Christer Boberg, Jan Lidin and Anders Lindgren, the disclosure of which is incorporated herein by reference.

TECHNICAL FIELD

The present invention generally relates to communication systems, devices, software and methods and, more particularly, to mechanisms and techniques for discovering service capabilities of users in communication systems.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc. also allow the users to communicate via e-mail, video conferencing, IM, etc. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases.

Many communication applications allow for real-time or near real-time communication that falls outside of the traditional voice communication associated with wireline and wireless telephone communications. Chat sessions, instant messaging, Short Message Service (SMS), video conferencing, are a few such communication vehicles. Many of these types of communications are expected to become increasingly popular, particularly in view of the proliferation of wireless devices and continual technological breakthroughs.

In order to implement such technologies, the "presence" technology is used to determine the location, willingness to communicate, and other parameters relating to real-time or near real-time communications. The presence technology generally refers to applications and services that facilitate location and identification of one or more endpoints to such communication links. For example, if a first user of a wireless, handheld device intends to initiate an IM session with a second IM user, presence services may be used to present the second user's willingness to receive IM messages. Presence services are an integral part of third generation (3G) wireless networks, and are intended to be employed across a wide variety of communication devices.

Presence information may be created at a presence server or an associated system. Presence information may be a status indicator that conveys the ability and willingness of a potential user to communicate with other users. The presence server may provide the presence information for distribution to other users (called watchers) to convey the availability of the user for communication. Presence information is used in many communication services, such as IM and recent implementations of voice over IP communications.

More specifically, a user client may publish a presence state to indicate its current communication status. This published state informs others that wish to contact the user of his availability and willingness to communicate. One use of presence is to display an indicator icon on IM clients, for example a choice of a graphic symbol with an easy-to-convey meaning, and a list of corresponding text descriptions of each of the states. This is similar to the "on-hook" or "off-hook" state of a fixed telephone.

Common states regarding the user's availability are "free for chat", "busy", etc. Such states exist in many variations across different modern instant messaging clients. However, the standards support a rich choice of additional presence attributes that may be used for presence information, such as user mood, location, or free text status.

Presence service is a network service which accepts, stores and distributes presence information. The presence service may be implemented as a single server or may have an internal structure involving multiple servers and proxies. There may be complex patterns of redirection and proxying while retaining logical connectivity to a single presence service. Also presence service may be implemented as direct communication among presentity and watchers, i.e., a server is not required.

A number of entities may be implemented in a presence service architecture. One of these entities is the presentity, which is an entity that provides presence information. Another entity is the presence server, which receives presence information from presentities. The watcher is an entity that is interested in the presence information.

The presence information (e.g., location, willingness to communicate at a certain time or with certain users, etc.) may be collected and utilized by presence servers, which may notify authorized "watchers" who are interested in certain presence information. Watcher applications may be implemented in wireline and/or wireless terminals to obtain presence information from the presence servers about other users. This may come in the form of a notification, issued to the watcher by the presence server.

Notifications to users/watchers that a targeted user/device has become available may be sent as complete or partial presence information. In other words, there are a number of different pieces of presence information that can be associated with the totality of the presence information. In a similar manner to the presence information and associated structure, there are location servers and location information regarding the users. The location information may include geographical location information.

In the IMS/SIP standard solutions SIP Publish is used to upload presence information to a presence server. Recently 3GPP has introduced Service Identification for communication services (CoSe) and IMS applications (IARI). Feature tags included in the SIP Register message includes the communication services, IMS applications and other capabilities that are available on the registering terminal. This information is equivalent to the service element information that is conveyed in the presence publication.

When a terminal is powered-on, it normally first sends a SIP Register message over an air interface to the registrar, e.g., home subscriber server (HSS), and thereafter sends a SIP Publish message to publish its available services to the Presence Server. In fact, there may be several publication messages sent by a UE over the air interface being powered on since many terminal implementations often require each application to send a separate SIP publish with service specific data.

The GSMA RCS industry initiative developed during the last few years to generate new applications for "always on" customers has not really taken off yet in the market. Recently a slightly new approach to RCS, called RCS-e, has been suggested which provides a subset of the functionality provided by RCS (with some extensions). One idea behind RCS-e is, for example, to provide a simplified RCS architecture where some functionality has been omitted, or rather made optional, in the hopes of gaining more rapid adoption in the market. For instance, presence information is optional in RCS-e.

One problem with the RCS-e approach when presence functionality has been removed is that the service capabilities of other users are no longer available. In order to address that problem, RSC-e proposes the use of SIP OPTIONS requests peer-to-peer instead to probe for the service capabilities of another user. A problem with this solution is that each client needs to send SIP OPTIONS requests to all users in the address book to check for the capabilities, which generates a huge amount of traffic in the network. Since the SIP OPTIONS request is sent on the UNI on both the originating and the terminating side it generates traffic also on the RAN as well as contributing to the battery drain on the handsets.

One solution to this problem is for client devices to include all of their service capabilities as feature tags when they register with the communication system, so that the Capability application server (AS) receives them in the 3rd Party Register request sent from the IMS Core Node to the Capability AS. However, it may be the case that the client will not include tags for all services that the client supports, which makes it difficult for the server to provide the correct capabilities back to a requestor. For instance, the client might include an ICSI for OMA IM but it won't be possible then to distinguish between whether that client, for example, has Chat and/or File Transfer service capabilities.

Accordingly, it would be desirable to provide devices, systems and methods for enabling capability discovery of client devices in such systems that avoid the afore-described problems and drawbacks.

SUMMARY

The following exemplary embodiments provide a number of advantages and benefits relative to existing service capability discovery techniques, devices and systems. For example, and without limitation, it will be apparent that one advantage associated with the following embodiments is to reduce traffic in the network, potentially by quite a significant amount, by enabling service capabilities to be cached in the network. When other users query for the capabilities, a response can be sent to the querying users without having to send out the query signals for the capabilities to other users. This saves traffic on the RAN by, for example, about 50%, minimizes the battery drain on the client devices which do not have to answer to multiple service discovery requests, as well as shorten the round trip time for the capability discovery operations. Moreover, there is no impact on the client side to implement these embodiments, and the UNI remains the same.

According to an exemplary embodiment, a method, stored in a memory and executing on a processor, for optimizing service capabilities storage in a communication system comprises receiving, by a capabilities application server, a first request, sent from a first user's client device associated with the capabilities application server, toward the capabilities application server, for service capability information associated with a second user's client device wherein the first request comprises service capability information associated with the first user's client device and storing, by the capabilities application server, the service capability information associated with the first user's client device in a storage location associated with the capabilities application server.

According to another exemplary embodiment, a method, stored in a memory and executing on a processor, for optimizing service capabilities storage in a communication system comprises receiving, by a capabilities application server, a first request, sent from a first user's client device toward the capabilities application server, for service capabilities information from a second user's client device associated with the capabilities application server, sending, from the capabilities applications server, a second request toward the second user's client device for the service capabilities information, receiving, by the capabilities application server, a reply to the second request comprising the service capabilities information and storing, by the capabilities application server, the service capabilities information in a storage location associated with the capabilities application server.

According to another exemplary embodiment, a method, stored in a memory and executing on a processor, for optimizing service capabilities storage in a communication system comprises receiving, by a capabilities application server, a registration request, from a first user's client device associated with the capabilities application server, wherein the registration request comprises identity information associated with the first user's client device, sending, by the capabilities application server, a first request for service capabilities information toward the first user's client device based on the identity information, receiving, by the capabilities application server, a reply to the first request comprising service capabilities information associated with the first user's client device and storing, by the capabilities application server, the service capabilities information in a storage location associated with the capabilities application server.

According to another exemplary embodiment, a capabilities application server comprises a processor for executing computer instructions and a memory for storing the computer instructions wherein the computer instructions further comprise a communication component for sending and receiving messages associated with managing service capabilities information from a plurality of user client devices, an engine component for processing the messages and collecting the service capabilities information and a storage component for storing the service capabilities information for retrieval by the engine component to optimize further requests for the service capabilities information.

According to an embodiment, a method for storing service capabilities in a communication system comprises receiving, in a network node, a request signal from a first user's client device which requests service capability information associated with a second user wherein the request signal also includes service capability information associated with said first user's client device; forwarding, by the network node, the request signal to an capabilities application server; and storing, by the capabilities application server, the service capability information associated with the first user's client device.

The capabilities application server (CAS) can be an originating or a terminating CAS. The service capability information can be stored in an Accept-Contact header of the request signal. The CAS can also store the GRUU (or sip.instance) information with the service capability information to permit subsequent aggregation and/or retrieval of that information in response to a service capability query from another user.

According to an embodiment, a capability application server (CAS) comprises: an interface configured to receive a request signal from a first user's client device which requests service capability information associated with a second user wherein the request signal also includes service capability information associated with said first user's client device; and a processor configured to parse and store the service capability information associated with the first user's client device.

The capabilities application server (CAS) can be an originating or a terminating CAS. The service capability information can be stored in an Accept-Contact header of the request signal. The CAS can also store the GRUU (or sip.instance) information with the service capability information to permit subsequent aggregation and/or retrieval of that information in response to a service capability query from another user.

According to another embodiment, a method for storing service capabilities in a communication system comprises receiving, at a capabilities application server, an indication that a client device has registered with the communication system; polling, by the capabilities application server, the client device with a signal requesting that client device to send service capability information; receiving, by the capabilities application server, a signal with the service capability information; and storing, by the capabilities application server, the service capability information.

ABBREVIATIONS

3GPP 3$^{rd}$ Generation Partnership Project
CAS Capability Application Server
GRUU Global Routable UA URI
GSMA Group Special Mobile Association
HTTP Hypertext Transfer Protocol
ICSI IMS Communication Service Identifier
IMS IP Multimedia Subsystem
OMA Open Mobile Alliance
RAN Radio Access Network
RCS Rich Communication Suite
SIP Session Initiation Protocol
UA User Agent
UE User Equipment
UNI User-Network Interface
URI Uniform Resource Identifier

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of capability discovery servers and associated nodes in communication systems. However, the embodiments to be discussed next are not limited to these systems but may be applied to other communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

According to exemplary embodiments, the capabilities of client devices can be cached in the network, for example as those capabilities are received in the SIP OPTIONS request and responses, instead of relying on 3$^{rd}$ Party Register requests to obtain the service capabilities information. This cached information, which has been stored in the network, is then used to provide capability information when requested in subsequent requests.

Figure 1:
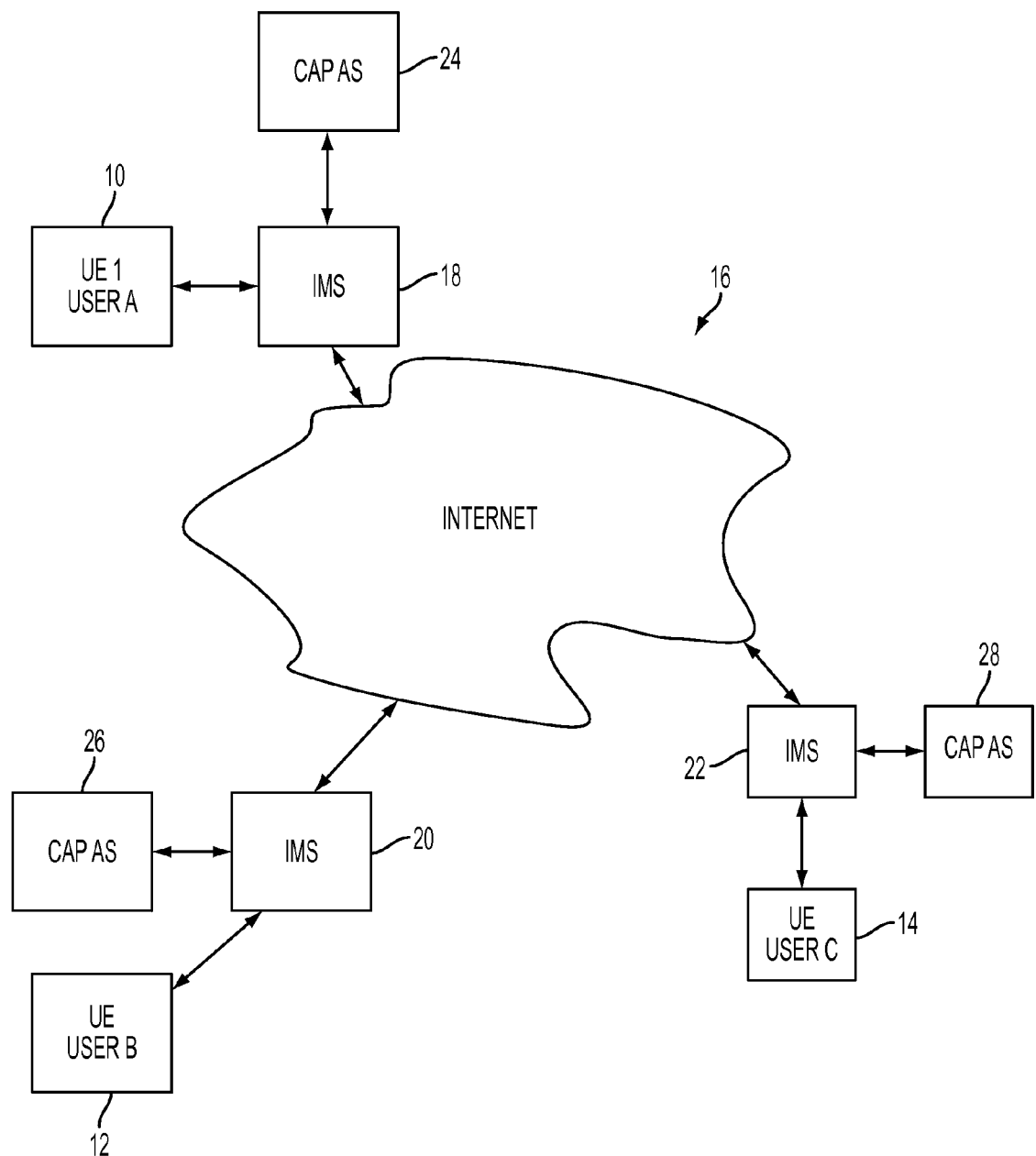
FIG. 1 is a schematic diagram of a communication system including a user client devices, network nodes and capabilities application servers.

In order to provide some context for such embodiments, and as shown in FIG. 1, a general communication system that discovers, stores and provides clients' capability information can include user equipments (UEs) 10, 12 and 14 which are connected (or are capable of connecting) to the network 16. UEs 10, 12, 14 can be any type of client device, e.g., a mobile phone, computer, tablet device, PDA, television, or other device, etc. In this example, the network 16 includes IP Multimedia Subsystem (IMS) core elements 18, 20 and 22. These elements may be interconnected via the Internet, or may be interconnected via other communication means. The communication paths shown in FIG. 1 may be wireline and/or wireless. If the UEs 10, 12, and/or 14 are connected to the network 16 wirelessly then they may be connected thereto via a suitable radio access network (RAN, not shown). Each of the UEs 10, 12, 14 may have a Capabilities Application Server (AS) 24, 26, 28, respectively, associated therewith. Alternatively, various UEs may be associated with the same Cap. AS, as will be seen below.

Figure 2:
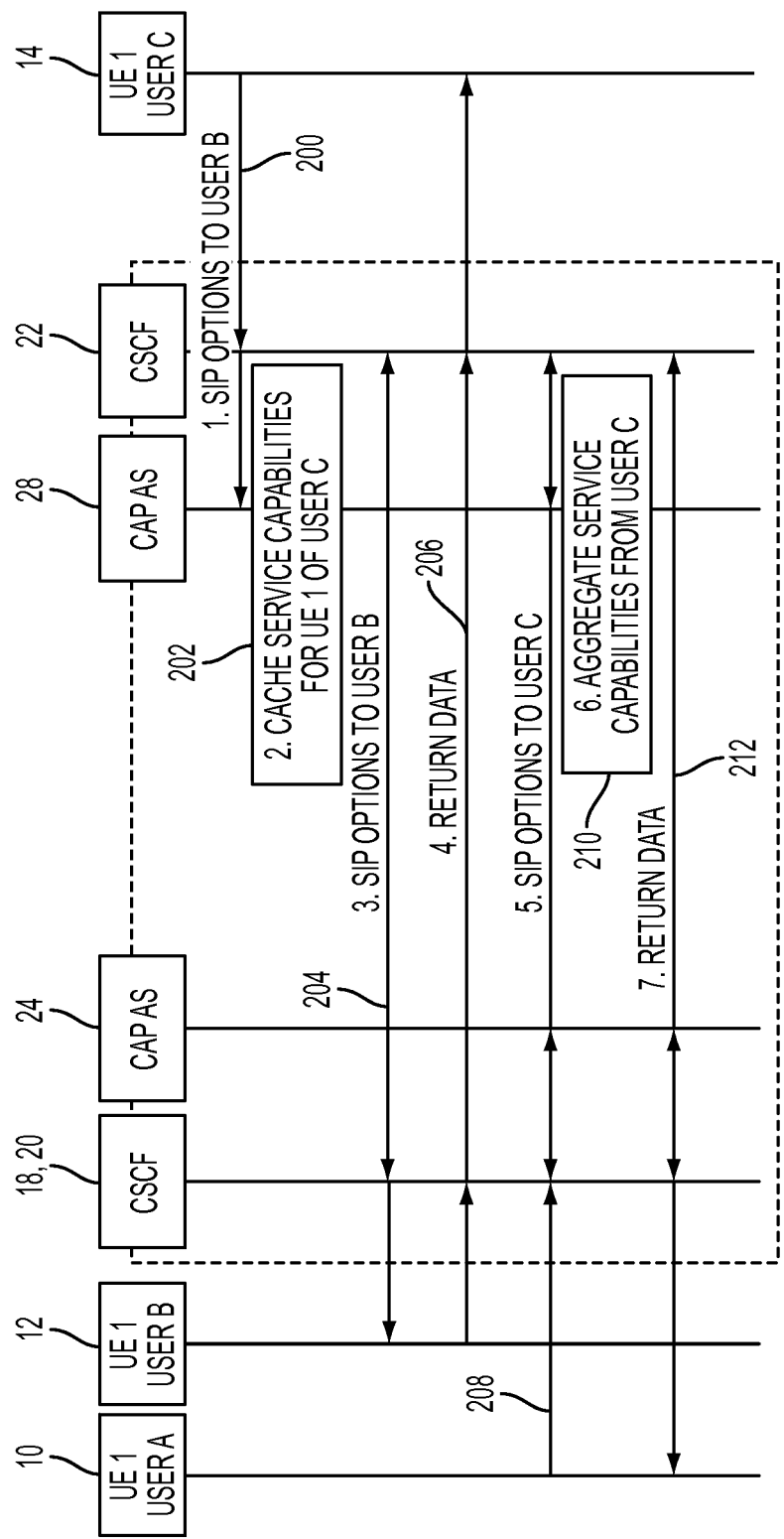
FIG. 2 is a signaling diagram depicting service capabilities stored in an originating capabilities application server.

According to a first embodiment, the capabilities of a user (or alternatively stated the capabilities of that user's client device(s)) can be cached in an originating Capability AS. Service capabilities can include (but are not limited to) presence, location, message handling, broadcast/multicast, and/or or group management, etc. An example of this embodiment is illustrated by way of the signaling diagram of FIG. 2. Therein, as indicated by signal 200, a request from the client device 14 associated with user C includes the supported capabilities of user C in the Contact header of that signal. The request is routed via a node 22 of the IMS Core to an originating Capability AS (CAS) 28.

According to this embodiment, the CAS 28 will cache the capabilities of UE 1 14 for user C together with the GRUU (or sip.instance), as generally indicated by block 202. The request is proxied by the IMS Core Node 20, 22 to user B in the terminating network, as indicated by signal 204. It should be noted in the exemplary embodiment that the cached capabilities for user C comprise the capabilities of all of user C's registered devices aggregated and included in the 204 signal.

In response to the request signal 204, User B's client device 12 transmits a further response signal 206 which contains the service capabilities of user B. In this example, at a later point in time, user A 10 queries the capabilities of user C by sending a SIP OPTIONS request 208, routed via IMS Core 18, 22 to the CAS 28 belonging to (associated with) user C 14. The CAS 28 aggregates the services capabilities for all registered clients of user C 14, as indicated by block 210. A response signal 212 is then sent back to user A 10, which signal 212 comprises the aggregated service capabilities of user (client device) C 14 (all devices) which were previously stored in a memory device associated with CAS 28. Thus, it can be seen that, according to this embodiment, an originating CAS can cache (store) a client device's capabilities for later retrieval and forwarding to other devices which inquire about that client device's capabilities.

As an alternative, or in conjunction with the afore-described embodiment wherein service capabilities are cached in an originating CAS, service capabilities can be cached in a terminating CAS as will now be described with respect to the exemplary signaling diagram of FIG. 3. Therein, as shown by step/signal 302, User C 10 queries the capabilities of user A 10 by sending a SIP OPTIONS request 302, routed via IMS Core 22, 18 to the CAS 24 belonging to (associated with) user A 10. In this exemplary case there are no service capabilities cached for user A 10 at the time that the CAS 24 receives the request signal 302, as indicated by block 304, so a SIP OPTIONS request signal 306 will be sent out to each registered client of user A.

Figure 3:
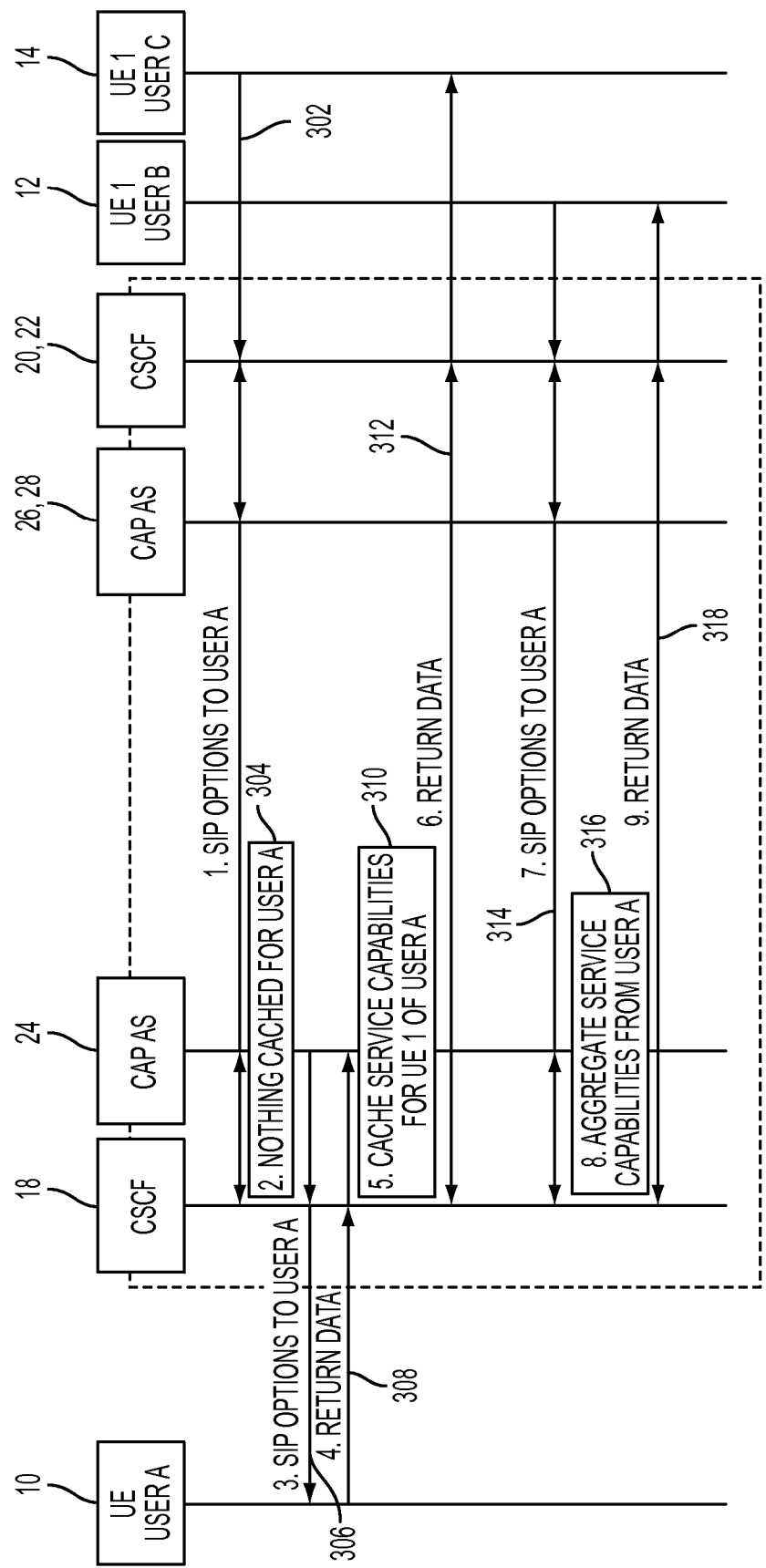
FIG. 3 is a signaling diagram depicting service capabilities stored in a terminating capabilities application server.

As shown in FIG. 3, the request 306 is routed through IMS Core 18 to user A's registered client(s) 10. It will be appreciated by those skilled in the art that the detection of service capabilities associated with a particular user can refer to the discovery of service capabilities associated with one or more than one device which is associated with (registered to) that user. The response to signal 306, i.e., signal 308, contains the service capabilities of user A. According to this embodiment, the response 308 which is sent back to the CAS 24 includes the supported capabilities of user A 10 in the Accept-Contact header of the signal 308. The CAS 24 then caches the capabilities for each registered client of user A together with the GRUU (or sip.instance) as indicated by block 310. The CAS 24 aggregates the services capabilities for all registered clients of user A and a response signal 312 is sent back to user A including the service capabilities.

In this example, user B 12 subsequently queries the capabilities of user A by sending a SIP OPTIONS request 314, routed via IMS Core 18, 20 to the CAS 24 belonging to user A. As indicated by block 316, the CAS 24 aggregates the services capabilities for all registered clients of user A and transmits a response signal 318 back to user B 12 including the service capabilities of user A via the network.

Figure 4:
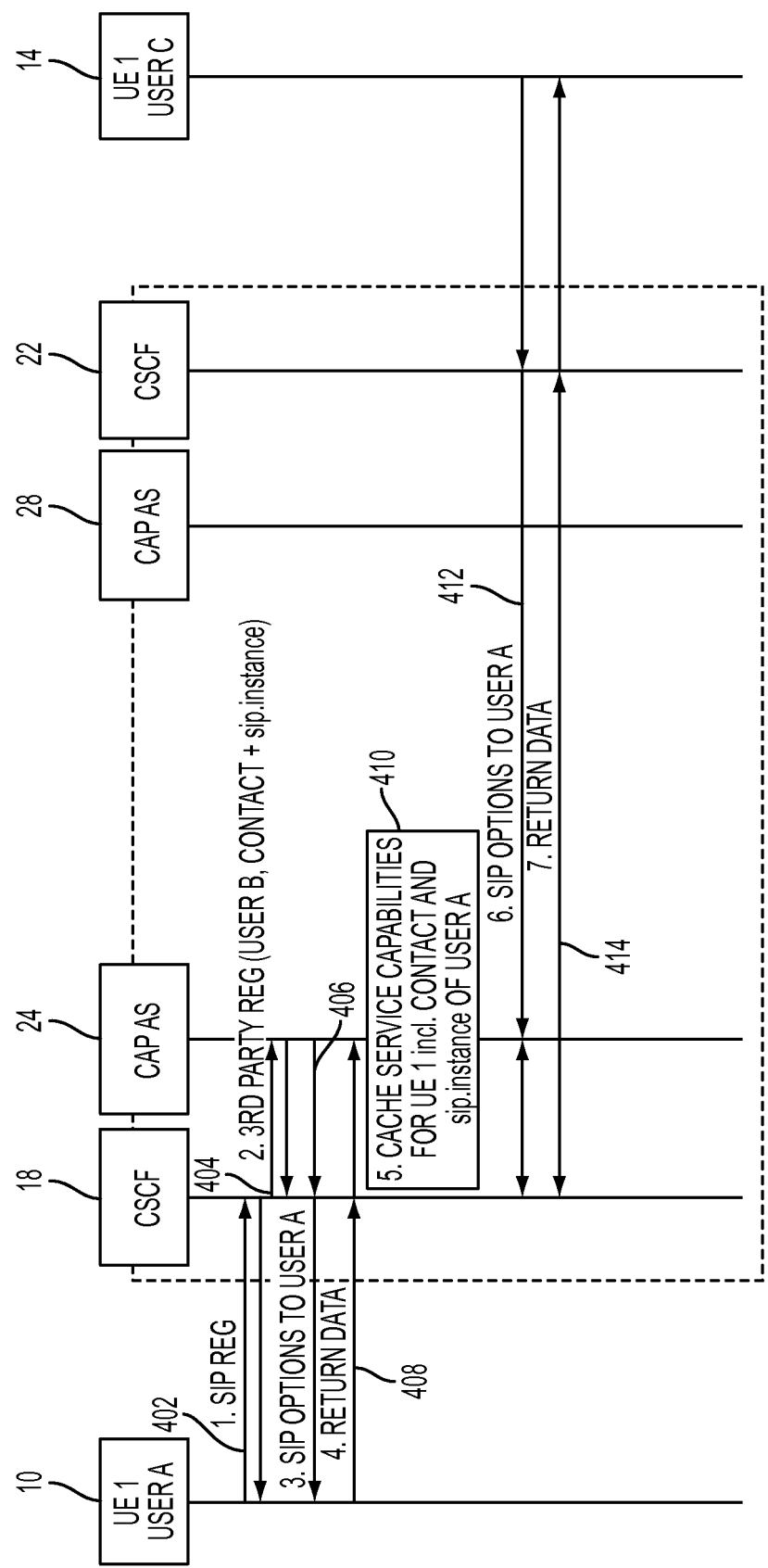
FIG. 4 is a signaling diagram depicting service capabilities stored after capabilities application server receives a client registration and polls the client for service capabilities information.

A third alternative, which can be used by itself in a system or in conjunction with either or both of caching service capabilities in originating and/or terminating CASs, is to poll and cache service capabilities after registration as will now be discussed with respect to the exemplary signaling diagram of FIG. 4. Therein, as indicated by signal 402, User A (device 10) registers in the IMS network 18 (which results in an unnumbered acknowledgement signal back from the IMS network 18 to client device 10). Next, a 3rd Party Registration request signal 404 is sent to the CAS 24 (again an unnumbered acknowledgement signal is shown).

The CAS 24 according to this embodiment detects the new registration and will send out a SIP OPTIONS request 406 to retrieve the service capabilities of the newly registered client, i.e., user A. The response signal 408 which is returned to the CAS 24 includes the supported capabilities of user A in the Accept-Contact header of signal 408. The CAS 24 caches the capabilities for UE 1 10 of user A together with the GRUU (or sip.instance) as indicated by block 410. It should be noted in the exemplary embodiment that the supported capabilities of a User A includes the capabilities from all of User A's registered client devices.

Subsequently, in this example, user C 14 queries the capabilities of user A by sending a SIP OPTIONS request 412, routed via the IMS Core 22, 18 to the CAS 24 belonging to user A 10. The CAS 24 aggregates the services capabilities for all registered clients of user A10 and then a response signal 414 is sent back to user C 14 including the service capabilities of the client devices associated with user A.

Figure 5:
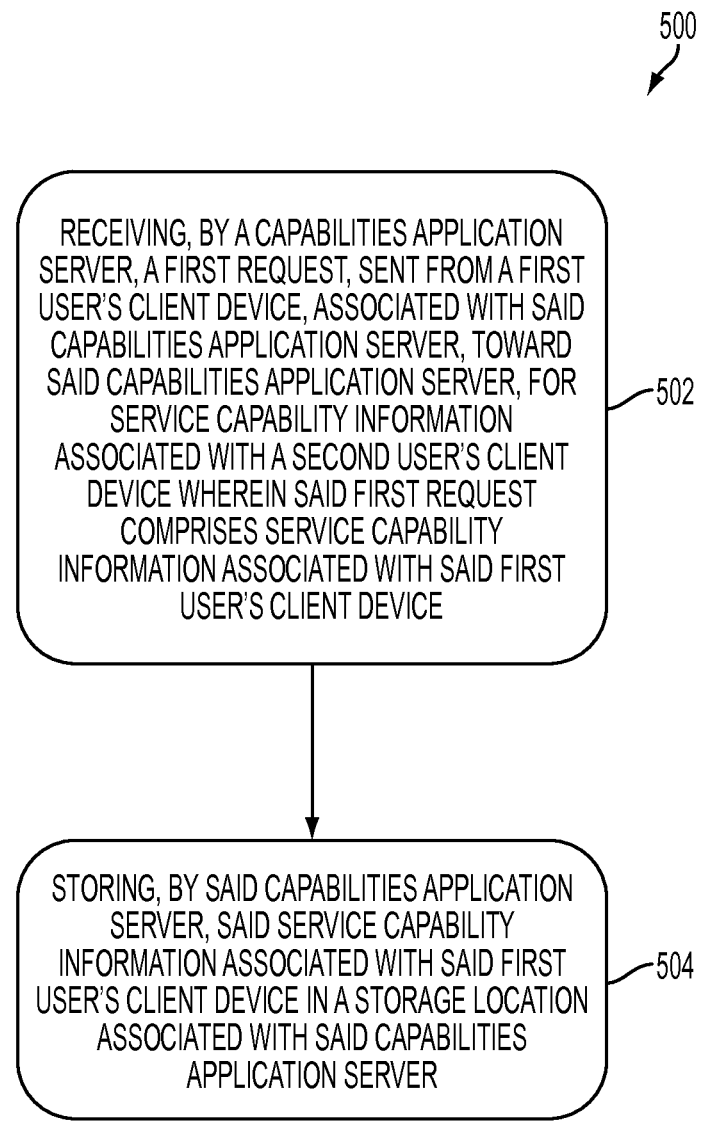
FIG. 5 is flowchart depicting a method for optimizing service capabilities storage at an originating capabilities application server in a communication system.

Looking now to FIG. 5, an exemplary method embodiment 500 for optimizing service capabilities storage in a communication system is depicted. Starting at step 502 in the exemplary method embodiment 500, a capabilities application server receives a first request from a first user's client device for service capability information. It should be noted in the exemplary method embodiment 500 that the first user's client device is associated with the capabilities application server. It should further be noted in the exemplary method embodiment 500 that the request for service capability information is for a second user's client device and that the first request contains service capability information associated with the first user's client device.

Continuing at step 504 of the exemplary method embodiment 500, the capabilities application server stores the service capability information associated with the first user's client device in a storage location associated with the capabilities application server. In further aspects of the exemplary method embodiment 500, service capabilities access can be optimized by the capabilities application server when future requests arrive for capabilities information that the capabilities application server has stored. Continuing with the further aspects of the exemplary method embodiment 500, at a subsequent time the capabilities application server can receive a second request from a third user's client device for service capability information associated with the first user's client device. Next in the further aspects of the exemplary method embodiment 500, the capabilities application server can determine that the requested service capabilities information is available from the storage location without the need for sending another request to the first user's client device for service capabilities information. Continuing with the further aspects of the exemplary method embodiment 500, the capabilities application server can collect the service capability information from the storage location and send a reply to the second request with the requested service capability information.

In another aspect of the exemplary method embodiment 500, the first request can be directed through an IMS Core node associated with the capabilities application server. It should be noted in the exemplary method embodiment 500 that the first request and the second request are Session Initiation Protocol (SIP) Options requests. It should further be noted in the exemplary method embodiment 500 that the service capability information can include a Globally Routable User Agent Uniform Resource Identifier (GRUU) or a Session Initiation Protocol identifier and is associated with a Contact header with respect to the first request. In another aspect of the exemplary method embodiment 500, the capabilities application server can aggregate the service capabilities of registered clients associated with a user.

Figure 6:
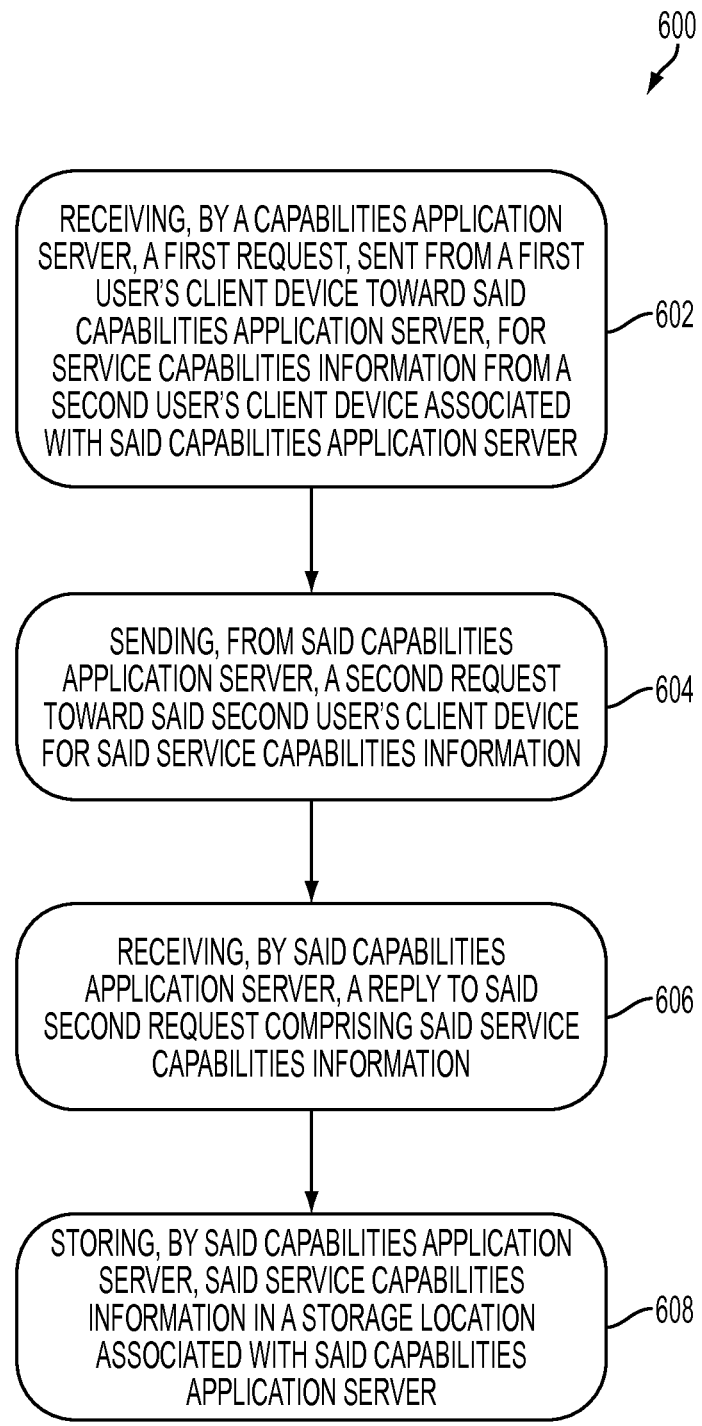
FIG. 6 is flowchart depicting an alternative method for optimizing service capabilities storage at a terminating capabilities application server in a communication system.

Looking now to FIG. 6, another exemplary method embodiment 600 for optimizing service capabilities storage in a communication system is depicted. Beginning at step 602 of the exemplary method embodiment 600, a capabilities application server receives a first request from a first user's client device. It should be noted in the exemplary method embodiment 600 that the request is for service capabilities information from a second user's one or more client devices. It should further be noted in the exemplary method embodiment 600 that the second user's one or more client devices are associated with the capabilities application server.

Next at step 604 of the exemplary method embodiment 600, the capabilities application server sends a second request toward the second user's one or more client devices. It should be noted in the exemplary method embodiment 600 that the second request is a request for the service capabilities information associated with the second user's one or more client devices. Continuing at step 606 of the exemplary method embodiment 600, the capabilities application server receives a reply to the second request for service capabilities information. It should be noted in the exemplary method embodiment 600 that the request comprises the service capabilities information associated with the second user's client device.

Next at step 608 of the exemplary method embodiment 600, the capabilities application server stores the service capabilities information in a storage location associated with the capabilities applications server. It should be noted in the exemplary method embodiment 600 that the storage location can be on the capabilities application server or it can be on another server communicatively connected to the capabilities application server.

In further aspects of the exemplary method embodiment 600, the service capabilities access can be optimized by the capabilities application server receiving a third request from a third user's client device for service capabilities information associated with the second user's client device. Continuing with the exemplary method embodiment 600, the capabilities application server can send a reply to the third request with the reply comprising the service capabilities information retrieved from the storage location associated with the capabilities application server. It should be noted in the exemplary method embodiment 600 that the capabilities application server does not send a request to the second user's client device. It should further be noted in the exemplary method embodiment 600 that any requests for service capabilities information already in a storage location is satisfied from the storage location without requiring any further requests to the target user's client device, resulting in greatly reduced communication traffic associated with obtaining service capabilities information.

In a further aspect of the exemplary method embodiment 600, the first request can be directed through an IMS Core node and the first, second and third request can be a Session Initiation Protocol (SIP) Options request. It should be noted in the exemplary embodiment 600 that the service capabilities information can comprise a Globally Routable User Agent Uniform Resource Identifier (GRUU) and is associated with an Accept-Contact header. It should further be noted in the exemplary method embodiment 600 that a reply to any of the aforementioned requests can comprise aggregating service capabilities of one or more registered clients associated with a user.

Figure 7:
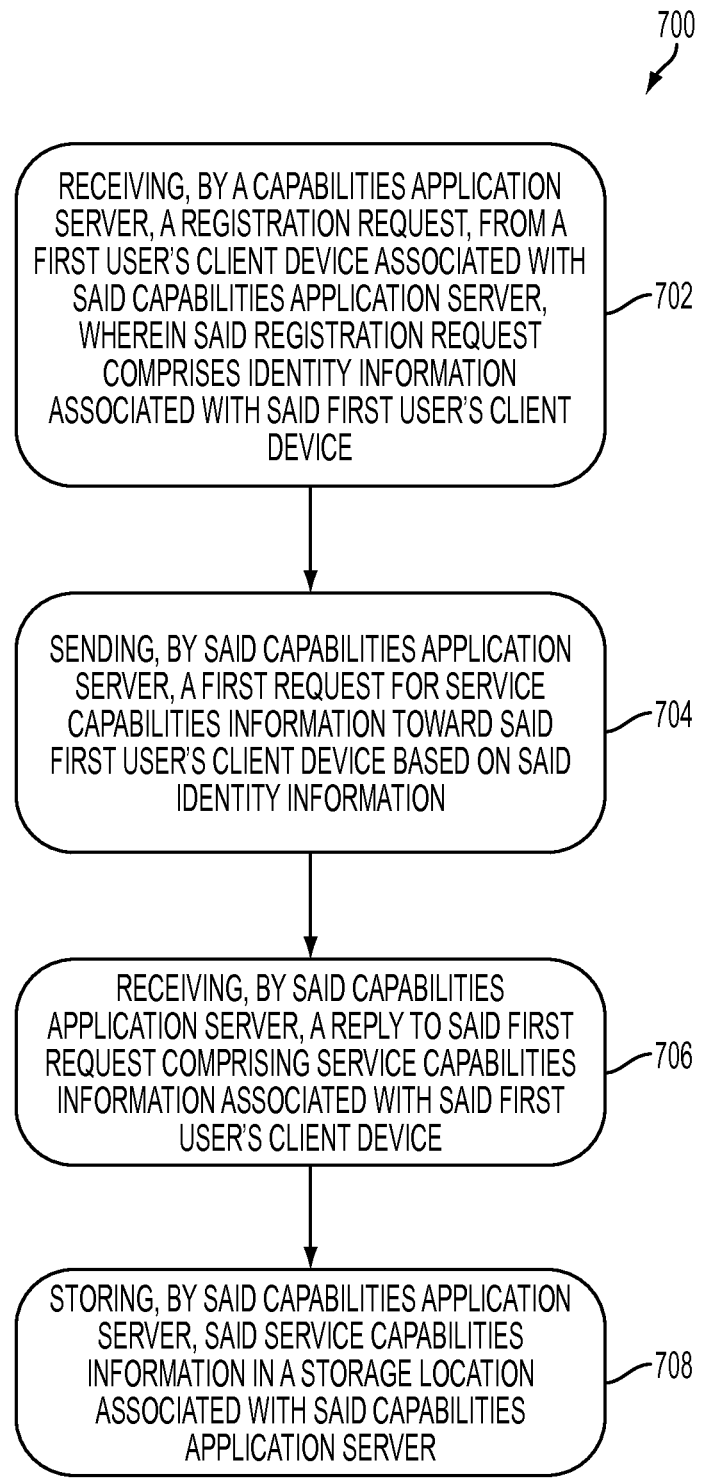
FIG. 7 is flowchart depicting an alternative method for optimizing service capabilities storage based on client registration and polling in a communication system.

Looking now to FIG. 7, another exemplary method embodiment 700 for optimizing service capabilities storage in a communication system is depicted. Beginning at step 702 of the exemplary method embodiment 700, a capabilities application server receives a registration request from a first user's client device. It should be noted in the exemplary method embodiment 700 that the first user's client device is associated with the capabilities application server. It should further be noted in the exemplary method embodiment 700 that the registration request comprises identity information associated with the first user's client device.

Next at step 704 of the exemplary method embodiment 700, the capabilities application server sends a first request toward the first user's client device. It should be noted in the exemplary method embodiment 700 that the first request is a request for the service capabilities information associated with the first user's client device. It should further be noted in the exemplary method embodiment 700 that the first request is addressed based on the identity information provided in the registration request. Continuing at step 706 of the exemplary method embodiment 700, the capabilities application server receives a reply to the first request for service capabilities information. It should be noted in the exemplary method embodiment 700 that the request comprises the service capabilities information associated with the first user's client device.

Next at step 708 of the exemplary method embodiment 700, the capabilities application server stores the service capabilities information in a storage location associated with the capabilities applications server. It should be noted in the exemplary method embodiment 700 that the storage location can be on the capabilities application server or it can be on another server communicatively connected to the capabilities application server.

In further aspects of the exemplary method embodiment 700, the service capabilities access can be optimized by the capabilities application server receiving a second request from a second user's client device for service capabilities information associated with the first user's client device. Continuing with the exemplary method embodiment 700, the capabilities application server can send a reply to the second request with the reply comprising the aggregated service capabilities information retrieved from the storage location associated with the capabilities application server. It should be noted in the exemplary method embodiment 700 that the capabilities application server does not send a request to the any of the first user's client devices. It should further be noted in the exemplary method embodiment 700 that any requests for service capabilities information already in a storage location is satisfied from the storage location without requiring any further requests to the target user's client device, resulting in greatly reduced communication traffic associated with obtaining service capabilities information.

In a further aspect of the exemplary method embodiment 700, the registration request can be directed through an IMS Core node and the first and second request can be a Session Initiation Protocol (SIP) Options request. It should be noted in the exemplary embodiment 700 that the service capabilities information can comprise a Globally Routable User Agent Uniform Resource Identifier (GRUU) and is associated with an Accept-Contact header. It should further be noted in the exemplary method embodiment 700 that a reply to any of the aforementioned service capabilities information requests can comprise aggregating service capabilities information of one or more registered clients associated with a user.

Figure 8:
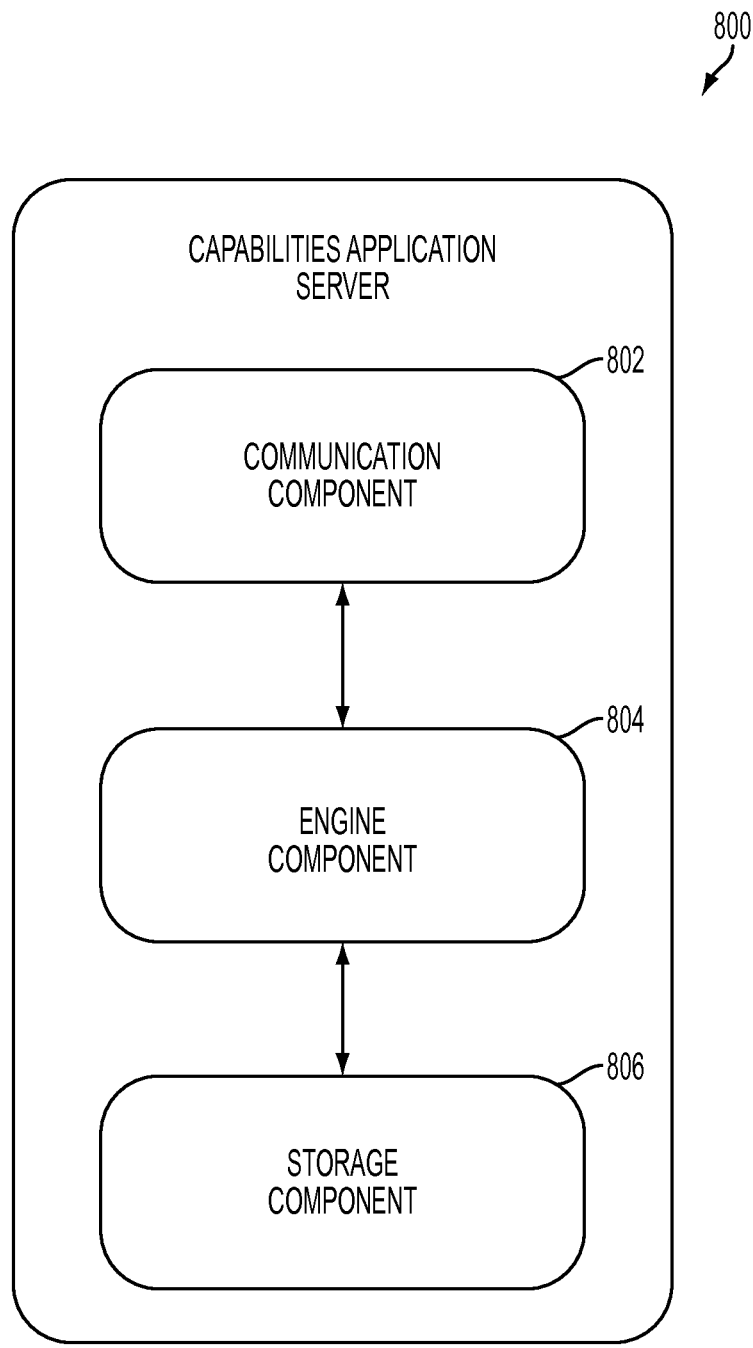
FIG. 8 is a schematic diagram representing a capabilities application server including a communications component, an engine component and a storage component.

Looking now to FIG. 8, an exemplary embodiment of a capabilities application server 800 including a communication component 802, an engine component 804 and a storage component 806 is depicted. The communications component of the exemplary embodiment provides the capabilities to communicate with other nodes of a communication system. It should be noted in the exemplary embodiment that other nodes include but are not limited to Call Session Control Function nodes and other capabilities application servers. In another aspect of the exemplary embodiment, the communication component 802 can implement one or more protocols including but not limited to the Session Initiation Protocol. For example, Hypertext Transfer Protocol (HTTP) messages, such as HTTP POST, can be used instead of SIP messages. In another aspect of the exemplary embodiment, the communication component 802 can exchange information with the engine component 804 for operational purposes such as but not limited to receiving requests such as but not limited to a Session Initiation Protocol Options message for delivery to other nodes or sending replies such as but not limited to a reply to a request for service capabilities information.

Continuing with the exemplary embodiment, the engine component 804 provides the capability to process the requests received from other nodes on the network via the communication component 802, generate replies associated with the received requests and store service capabilities information from user's client devices via the storage component 806. In another aspect of the exemplary embodiment, the engine component 804 provides the capability to aggregate the service capabilities of the clients registered for a particular user and provide the aggregation as a reply to a request for service capabilities information.

Next in the exemplary embodiment, the storage component 806 provides the capability to store service capabilities information for all the users associated with a particular capabilities application server 800. The storage component 806 can be a part of the capabilities application server 800 or it can be storage that is on another server and communicatively connected to the capabilities application server 800. It should be noted in the exemplary embodiment that the storage assigned for a particular instance of service capabilities information can be allocated, reallocated, moved, deleted, merged and divided based on the number of clients registered for a particular user.

From the foregoing, it will be apparent that one advantage associated with the foregoing embodiments is to reduce traffic in the network, potentially by quite a significant amount, by enabling service capabilities to be cached in the network. When other users query for the capabilities, a response can be sent to the querying users without having to send out the request for the capabilities to other users. This saves traffic on the RAN by, for example, about 50%, minimizes the battery drain on the client devices which do not have to answer to multiple service discovery requests, as well as shorten the round trip time for the capability discovery operations. Moreover, there is no impact on the client side to implement these embodiments, and the UNI remains the same.

Terminals that may act as client devices as described in connection with the exemplary embodiments may be desktop/personal computers, workstations, large-scale computing terminals, wireless terminals, or any other computing device capable of executing presence awareness applications. The wireless terminals may include devices such as wireless/cellular telephones, personal digital assistants (PDAs), or other wireless handsets, as well as portable computing devices. The mobile terminals may utilize computing components to control and manage the conventional device activity as well as the functionality provided by the exemplary embodiments. Hardware, firmware, software or a combination thereof may be used to perform the various methods and techniques described in this document.

Figure 9:
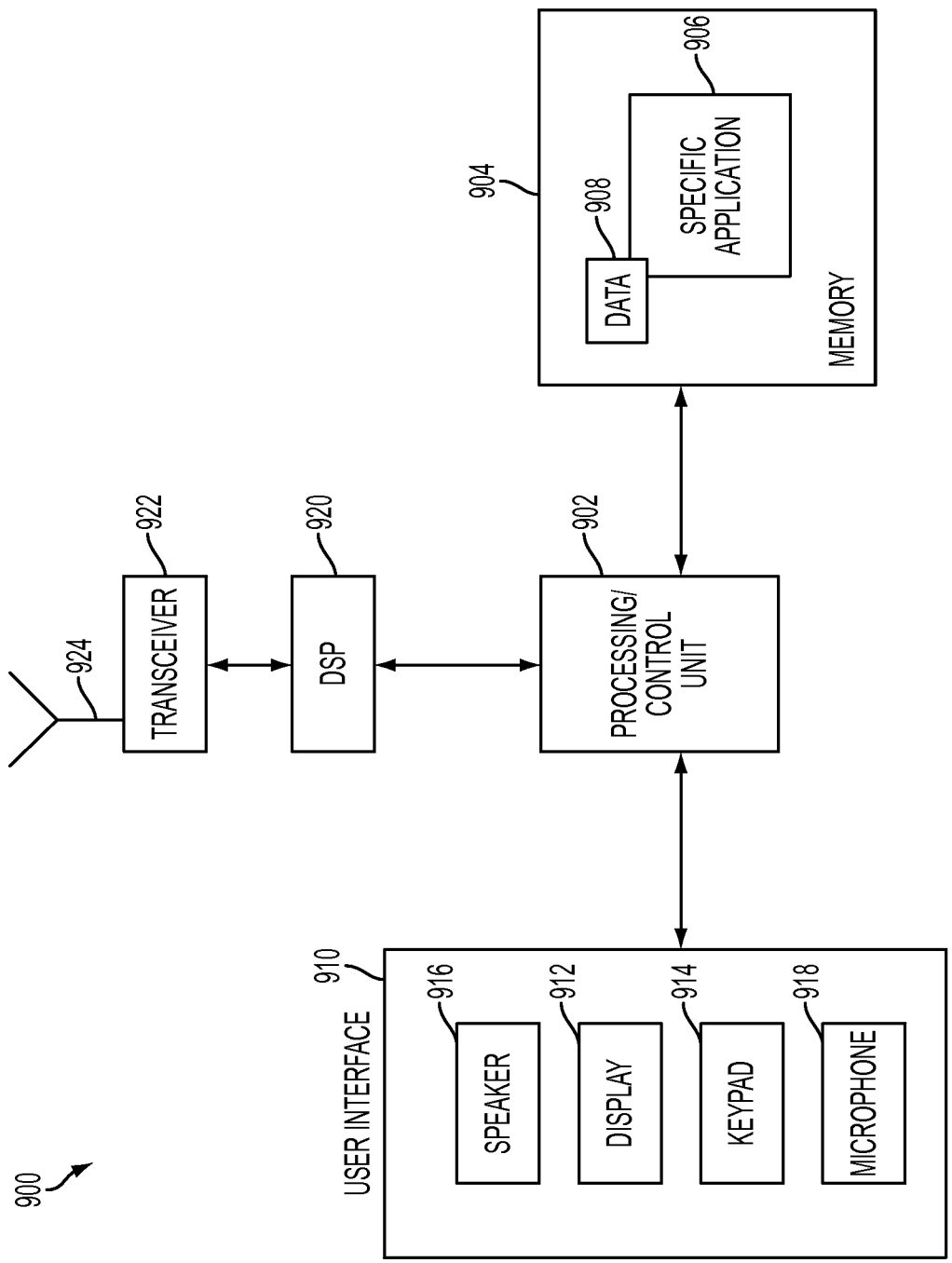
FIG. 9 is a schematic diagram of a user terminal.

For purposes of illustration and not of limitation, an example of a representative mobile terminal computing system capable of carrying out operations in accordance with the exemplary embodiments is illustrated in FIG. 9. It should be recognized, however, that the principles of the present exemplary embodiments are equally applicable to other devices.

The exemplary mobile computing arrangement 900 may include a processing/control unit 902, such as a microprocessor, reduced instruction set computer (RISC), or other central processing module. The processing unit 902 need not be a single device, and may include one or more processors. For example, the processing unit 902 may include a master processor and associated slave processors coupled to communicate with the master processor.

The processing unit 902 may control the basic functions of the mobile terminal as dictated by programs available in the storage/memory 904. More particularly, the storage/memory 904 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the mobile computing arrangement 900 via data signals, such as being downloaded electronically via a network, such as the Internet.

One of the programs that may be stored in the storage/memory 904 is a specific program 906. As previously described, the specific program 906 may interact with an IMS core network and/or a capabilities application server to request and supply capabilities associated with the device 900. As described above, service capabilities can include (but are not limited to) presence, location, message handling, broadcast/multicast, and/or group management, etc. The program 906 and associated features may be implemented in software and/or firmware operable by way of the processor 902. The program storage/memory 904 may also be used to store data 908 associated with the present exemplary embodiments. In one exemplary embodiment, the programs 906 and data 908 are stored in non-volatile electrically-erasable, programmable ROM (EEPROM), flash ROM, etc. so that the information is not lost upon power down of the mobile terminal 900.

The processor 902 may also be coupled to user interface 910 elements associated with the mobile terminal. The user interface 910 of the mobile terminal may include, for example, a display 912 such as a liquid crystal display, a keypad 914, speaker 916, and a microphone 918. These and other user interface components are coupled to the processor 902 as is known in the art. The keypad 914 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The mobile computing arrangement 900 may also include a digital signal processor (DSP) 920. The DSP 920 may perform a variety of functions, including analog-to-digital (ND) conversion, digital-to-analog (D/A) conversion, speech coding/decoding, encryption/decryption, error detection and correction, bit stream translation, filtering, etc. The transceiver 922, generally coupled to an antenna 924, may transmit and receive the radio signals associated with a wireless device.

The mobile computing arrangement 900 of FIG. 9 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 906 and associated features, and data 908, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

Figure 10:
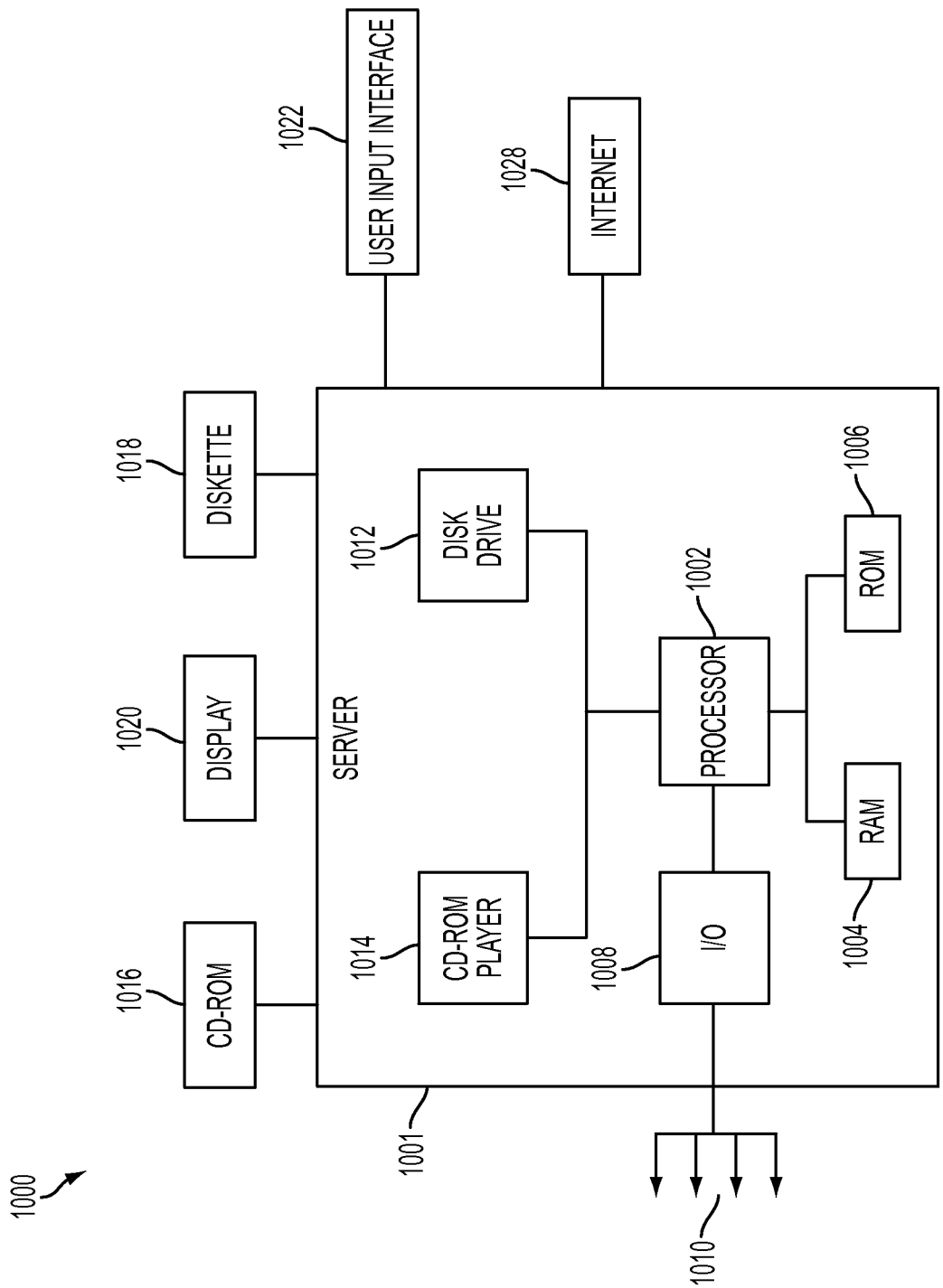
FIG. 10 is a schematic diagram of a server.

The capabilities application server, IMS Core node or other network nodes involved in the handling of service capabilities information in connection with the above described embodiments may be any type of computing device capable of processing and communicating service capabilities information. An example of a representative computing system capable of carrying out operations in accordance with the servers of the exemplary embodiments is illustrated in FIG. 10. Hardware, firmware, software or a combination thereof may be used to perform the various steps and operations described herein. The computing structure 1000 of FIG. 10 is an exemplary computing structure that may be used in connection with such a system.

The exemplary computing arrangement 1000 suitable for performing the activities described in the exemplary embodiments may include a capabilities server or a registrar node (e.g., HSS, etc.). Such a server 1001 may include a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as is known in the art, as dictated by software and/or firmware instructions.

The server 1001 may also include one or more data storage devices, including hard and floppy disk drives 1012, CD-ROM drives 1014, and other hardware capable of reading and/or storing information such as DVD, etc. In one embodiment, software for carrying out the above discussed steps may be stored and distributed on a CD-ROM 1016, diskette 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD displays, plasma display, cathode ray tubes (CRT), etc. A user input interface 1022 is provided, including one or more user interface mechanisms such as a mouse, keyboard, microphone, touch pad, touch screen, voice-recognition system, etc.

The server 1001 may be coupled to other computing devices, such as the landline and/or wireless terminals and associated watcher applications, via a network. The server may be part of a larger network configuration as in a global area network (GAN) such as the Internet 1028, which allows ultimate connection to the various landline and/or mobile client/watcher devices.

The disclosed exemplary embodiments provide a user terminal, a system, a method and a computer program product for obtaining, storing (caching) and supplying service capabilities associated with users and their device(s). It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

The invention claimed is:

1. A method, stored in a memory and executing on a processor, for optimizing service capabilities storage in a communication system, said method comprising:
   receiving, by a capabilities application server, a first request, sent from a first user's client device, associated with said capabilities application server, toward said capabilities application server, the first request including first service capability information specifying a first service capability of said first user's client device and asking for second service capability information specifying a second service capability of a second user's one or more client devices;
   storing, by said capabilities application server, said first service capability information in a storage location associated with said capabilities application server;
   receiving, by said capabilities application server, a second request, sent from a third user's client device toward said capabilities application server, the second request asking for said first service capability information; and
   sending, by said capabilities application server, a reply to said second request comprising said first service capabilities information from said storage location toward said third user's client device.

2. The method of claim 1, wherein said first request is directed through at least one IP Multimedia Subsystem node associated with said capabilities application server.

3. The method of claim 1, wherein said first request is one of a Session Initiation Protocol Options request and a Hypertext Transfer Protocol Post message.

4. The method of claim 1, wherein said first service capabilities information further comprises a Globally Routable User Agent Uniform Resource Identifier or a Session Initiation Protocol identifier.

5. The method of claim 1, wherein said first service capabilities information is associated with a Contact header included in said first request.

6. The method of claim 1, wherein said reply further comprises aggregating service capabilities of registered clients associated with said first user.

7. The method of claim 1, wherein said second request is one of a Session Initiation Protocol Options request and a Hypertext Transfer Protocol Post message.

8. A method, stored in a memory and executing on a processor, for optimizing service capabilities storage in a communication system, said method comprising:

receiving, by a capabilities application server, a first request, sent from a first user's client device toward said capabilities application server, the first request including first service capability information specifying a first service capability of said first user's client device and asking for second service capabilities information specifying a second service capability of a second user's one or more client devices;

sending, from said capabilities application server, a second request toward said second user's one or more client devices asking for said second service capabilities information; receiving, by said capabilities application server, a reply to said second request comprising said second service capabilities information;

storing, by said capabilities application server, said first and second service capabilities information in a storage location associated with said capabilities application server;

receiving, by said capabilities application server, a third request, sent from a third user's client device toward said capabilities application server, the second request asking for second service capability information specifying service capabilities of said second user's one or more client devices; and sending, by said capabilities application server, a reply to said third request comprising said second service capabilities information retrieved from said storage location toward said third user's client device.

9. The method of claim 8, wherein said first request is directed through at least one IP Multimedia Subsystem node associated with said capabilities application server.

10. The method of claim 8, wherein said first request is one of a Session Initiation Protocol Options request and a Hypertext Transfer Protocol Post message.

11. The method of claim 8, wherein said service capabilities information further comprises a Globally Routable User Agent Uniform Resource Identifier or a Session Initiation Protocol identifier.

12. The method of claim 8, wherein said second service capabilities information is associated with an Accept-Contact header included in said second request.

13. The method of claim 8, wherein said reply further comprises aggregating service capabilities of registered clients associated with said second user.

14. The method of claim 8, wherein said third request is one of a Session Initiation Protocol Options request and a Hypertext Transfer Protocol Post message.

\* \* \* \* \*

UNITED STATES PATENT AND TRADEMARK OFFICE
CERTIFICATE OF CORRECTION

PATENT NO. : 9,106,671 B2  
APPLICATION NO. : 13/418469  
DATED : August 11, 2015  
INVENTOR(S) : Klein et al.

Page 1 of 1

It is certified that error appears in the above-identified patent and that said Letters Patent is hereby corrected as shown below:

In the Specification

In Column 5, Line 62, delete "is" and insert -- is a --, therefor.

In Column 5, Line 65, delete "is" and insert -- is a --, therefor.

In Column 6, Line 1, delete "is" and insert -- is a --, therefor.

In Column 13, Line 4, delete "(ND)" and insert -- (A/D) --, therefor.

Signed and Sealed this  
Twenty-sixth Day of April, 2016

Michelle K. Lee  
*Director of the United States Patent and Trademark Office*